(12) United States Patent
Maruyama et al.

(10) Patent No.: US 11,565,452 B2
(45) Date of Patent: Jan. 31, 2023

(54) INJECTION MOLDING APPARATUS AND METHOD

(71) Applicant: Seiko Epson Corporation, Toyko (JP)

(72) Inventors: Hidenobu Maruyama, Azumino (JP); Kenta Anegawa, Matsumoto (JP)

(73) Assignee: SEIKO EPSON CORPORATION

( * ) Notice: Subject to any disclaimer, the term of this patent is extended or adjusted under 35 U.S.C. 154(b) by 52 days.

(21) Appl. No.: 17/346,379

(22) Filed: Jun. 14, 2021

(65) Prior Publication Data
US 2021/0387394 A1 Dec. 16, 2021

(30) Foreign Application Priority Data

Jun. 15, 2020 (JP) .............................. JP2020-102801

(51) Int. Cl.
B29C 45/77 (2006.01)

(52) U.S. Cl.
CPC .... B29C 45/77 (2013.01); *B29C 2945/76006* (2013.01); *B29C 2945/7618* (2013.01); *B29C 2945/76381* (2013.01)

(58) Field of Classification Search
CPC ........ B29C 45/706; B29C 45/76; B29C 45/77
See application file for complete search history.

(56) References Cited

U.S. PATENT DOCUMENTS

2007/0184146 A1  8/2007  Takeuchi

FOREIGN PATENT DOCUMENTS

| JP | H08-132492 A | 5/1996 |
|---|---|---|
| JP | 2005-306028 A | 11/2005 |
| JP | 2009-269182 A | 11/2009 |

*Primary Examiner* — James Sanders
(74) *Attorney, Agent, or Firm* — Harness, Dickey & Pierce, P.L.C.

(57) ABSTRACT

An injection molding apparatus includes a plasticizing portion, a measurement injection portion that is disposed between the plasticizing portion and a molding mold, measures the plasticized material, and injects the measured plasticized material into the molding mold, a first drive portion changing a relative position between the plasticizing portion and the measurement injection portion, a pressure detection portion detecting a pressure inside the measurement injection portion and a control portion, in which the measurement injection portion is configured such that a volume of an internal space thereof, in which the plasticized material is stored, changes according to a change in the relative position between the measurement injection portion and the plasticizing portion, and the control portion executes at least one of a measurement operation of causing the measurement injection portion to measure the plasticized material by controlling the first drive portion to move the plasticizing portion and the measurement injection portion in a direction away from each other, and an injection operation of injecting the measured plasticized material into the molding mold by controlling the first drive portion to move the plasticizing portion and the measurement injection portion in a direction approaching each other depending on the pressure.

12 Claims, 16 Drawing Sheets

INJECTION MOLDING APPARATUS AND METHOD

The present application is based on, and claims priority from JP Application Serial Number 2020-102801, filed Jun. 15, 2020, the disclosure of which is hereby incorporated by reference herein in its entirety.

BACKGROUND

1. Technical Field

The present disclosure relates to an injection molding apparatus and a method.

2. Related Art

Regarding an injection molding apparatus, for example, JP-A-8-132492 discloses an injection molding apparatus including a plasticizing section for producing molten resin, a metal mold, and an auxiliary cylinder that moves linked to a movement of the metal mold. The auxiliary cylinder is filled with the molten resin for injection into the metal mold by the plasticizing section.

In the apparatus described in JP-A-8-132492, by moving the auxiliary cylinder away from the plasticizing section, the molten resin is supplied from the plasticizing section to the auxiliary cylinder, and measurement is performed. Further, by moving the auxiliary cylinder so as to approach the plasticizing section, the injection of the molten resin from the auxiliary cylinder into the metal mold is performed. In an injection molding apparatus provided with components that perform injection or measurement by relative movement with respect to the plasticizing section in this way, further improvement in molding quality is desired.

SUMMARY

According to a first aspect of the present disclosure, an injection molding apparatus is provided. The injection molding apparatus includes: a plasticizing portion producing a plasticized material by plasticizing a material; a measurement injection portion that is disposed between the plasticizing portion and a molding mold, measures the plasticized material, and injects the measured plasticized material into the molding mold; a first drive portion changing a relative position between the plasticizing portion and the measurement injection portion; a pressure detection portion detecting a pressure inside the measurement injection portion; and a control portion, in which the measurement injection portion is configured such that a volume of an internal space thereof, in which the plasticized material is stored, changes according to a change in the relative position between the measurement injection portion and the plasticizing portion, and the control portion executes at least one of a measurement operation of causing the measurement injection portion to measure the plasticized material by controlling the first drive portion to move the plasticizing portion and the measurement injection portion in a direction away from each other, and an injection operation of injecting the measured plasticized material into the molding mold by controlling the first drive portion to move the plasticizing portion and the measurement injection portion in a direction approaching each other depending on the pressure.

According to a second aspect of the present disclosure, there is provided a method executed by an injection molding apparatus including a plasticizing portion producing a plasticized material by plasticizing a material, a measurement injection portion that is disposed between the plasticizing portion and a molding mold, measures the plasticized material, and injects the measured plasticized material into the molding mold, a first drive portion changing a relative position between the plasticizing portion and the measurement injection portion, and a pressure detection portion for detecting a pressure inside the measurement injection portion, in which the measurement injection portion is configured such that a volume of a space thereof, in which the plasticized material is stored, changes according to a change in the relative position between the measurement injection portion and the plasticizing portion. The method includes a measurement step of causing the measurement injection portion to measure the plasticized material by controlling the first drive portion to move the plasticizing portion and the measurement injection portion in a direction away from each other; and an injection step of injecting the measured plasticized material into the molding mold by controlling the first drive portion to move the plasticizing portion and the measurement injection portion in a direction approaching each other, in which at least one of the measurement step and the injection step is executed depending on the pressure.

DESCRIPTION OF EXEMPLARY EMBODIMENTS

A. First Embodiment

Figure 1:
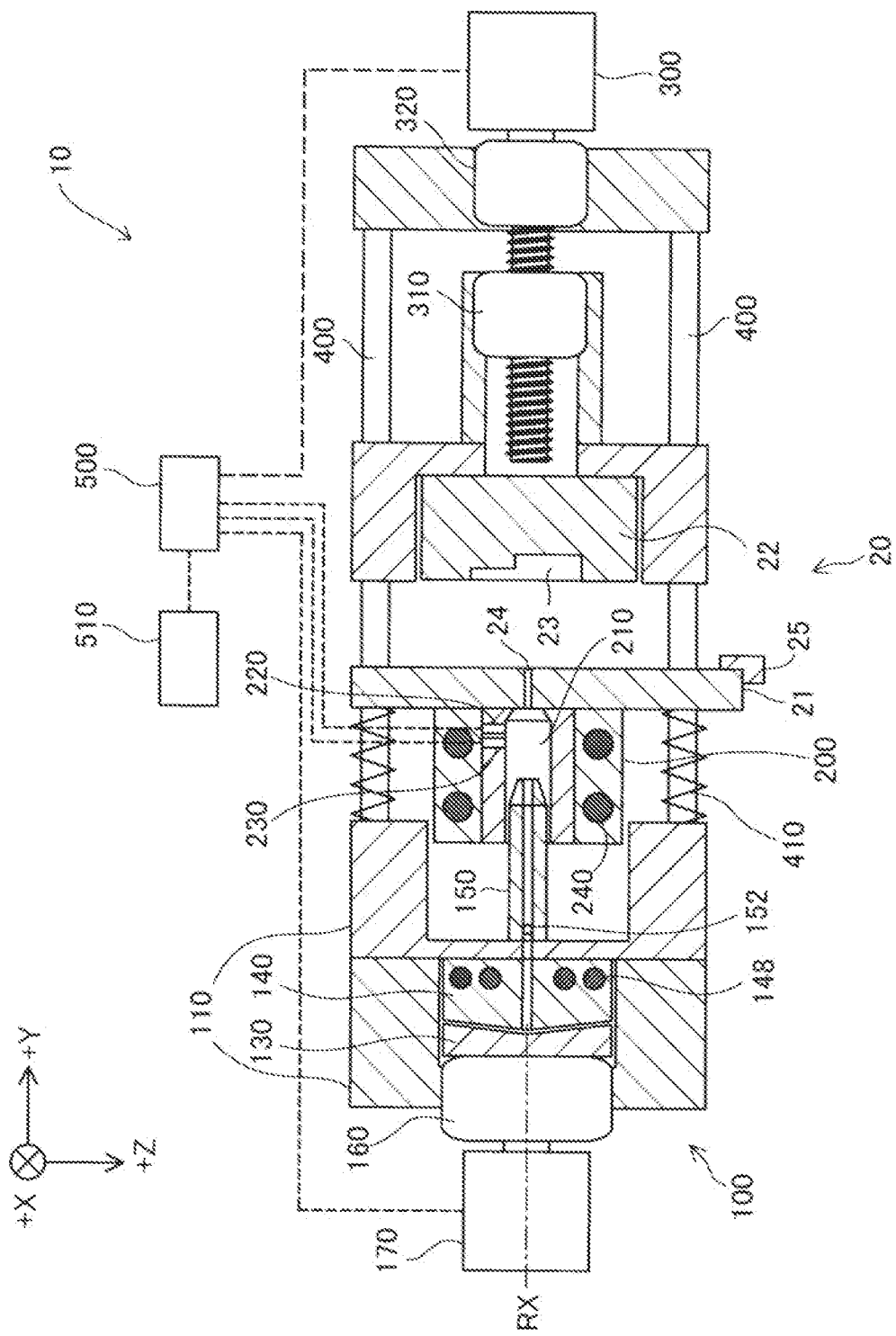
FIG. 1 is a diagram illustrating a schematic configuration of an injection molding apparatus according to a first embodiment.

FIG. 1 is a diagram illustrating a schematic configuration of an injection molding apparatus 10 according to a first embodiment. In FIG. 1, arrows along the X, Y, and Z directions orthogonal to each other are represented. The X, Y, and Z directions are directions along the X axis, Y axis, and Z axis, which are three spatial axes orthogonal to each other, and include a positive direction, which is one side direction along the X axis, Y axis, and Z axis, and a negative direction, which is a direction opposite to the direction, respectively. The X axis and the Y axis are axes along the horizontal plane, and the Z axis is an axis along the vertical line. The +Z direction is a vertically downward direction. The X, Y, and Z directions in FIG. 1 and the X, Y, and Z directions in the other diagrams represent the same direction.

The injection molding apparatus 10 is an apparatus that injects a plasticized material into a molding mold 20 to mold a molded product. The injection molding apparatus 10 includes a plasticizing portion 100, a measurement injection portion 200, a first drive portion 300, a pressure detection portion 220, and a control portion 500.

The plasticizing portion 100 includes a screw 130 and a barrel 140. The plasticizing portion 100 plasticizes at least a part of the material supplied from a material supply portion such as a hopper (not illustrated), produces a paste plasticized material having fluidity, and guides the material to the measurement injection portion 200. In the present embodiment, ABS resin formed in a pellet shape is used as a material. "Plasticization" means that a material having thermoplasticity is softened by being heated to a temperature equal to or higher than the glass transition point to exhibit fluidity. "Melting" means not only that the material having thermoplasticity is heated to a temperature equal to or higher than the melting point to become a liquid, but also that the material having thermoplasticity is plasticized. The screw 130 of the present embodiment may be referred to as a "flat screw" or a "scroll".

The screw 130 has a substantially cylindrical shape in which the height in the direction along the central axis RX is smaller than the diameter. The screw 130 is accommodated in a space surrounded by a case 110 and the barrel 140. A screw drive motor 170 is coupled to the screw 130 via a first speed reducer 160. The screw 130 is rotated about a central axis RX by the screw drive motor 170. The screw drive motor 170 is driven under the control of the control portion 500. The central axis RX may be referred to as a rotation axis of the screw 130.

Figure 2:
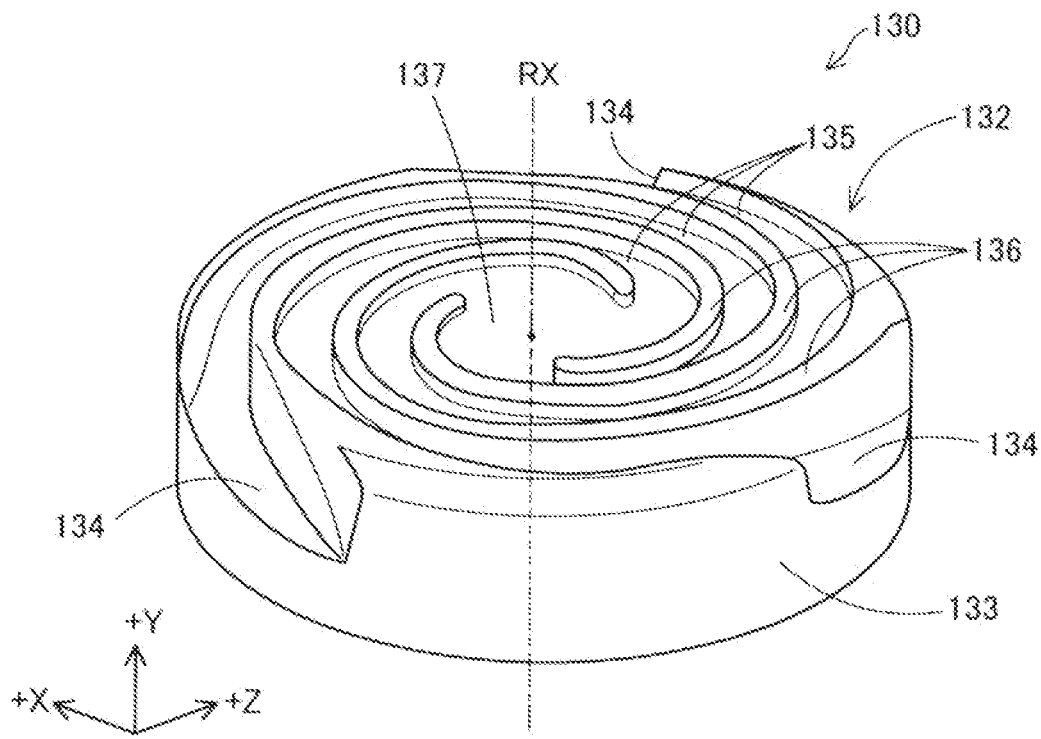
FIG. 2 is a perspective diagram of a screw.

FIG. 2 is a perspective diagram of the screw 130. The screw 130 has a groove forming surface 132 provided with a groove portion 135 on a surface facing the barrel 140. The groove portion 135 of the screw 130 configures a so-called scroll groove. The groove portion 135 extends in a swirling shape such that an arc is drawn from a central portion 137 toward the outer circumference of the screw 130. The groove portion 135 may be configured to extend in an involute curve shape or a spiral shape. The groove forming surface 132 is provided with a projection strip portion 136 that configures a side wall portion of the groove portion 135 and extends along each groove portion 135. The groove portion 135 is continuous to a material inlet 134 provided on a side surface 133 of the screw 130. The material inlet 134 is a part that receives a material in the groove portion 135.

The material supplied from the material supply portion is supplied between the screw 130 and the barrel 140 via the material inlet 134.

FIG. 2 illustrates an example of a screw 130 having three groove portions 135 and three projection strip portions 136. The number of groove portions 135 or projection strip portions 136 provided in the screw 130 is not limited to three. The screw 130 may be provided with only one groove portion 135 or may be provided with two or more groove portions 135. Further, any number of projection strip portions 136 may be provided according to the number of groove portions 135.

FIG. 2 illustrates an example of the screw 130 in which the material inlets 134 are formed at three places. The number of material inlets 134 provided in the screw 130 is not limited to three. The material inlet 134 may be provided at only one place in the screw 130 or may be provided at a plurality of places of two or more places.

Figure 3:
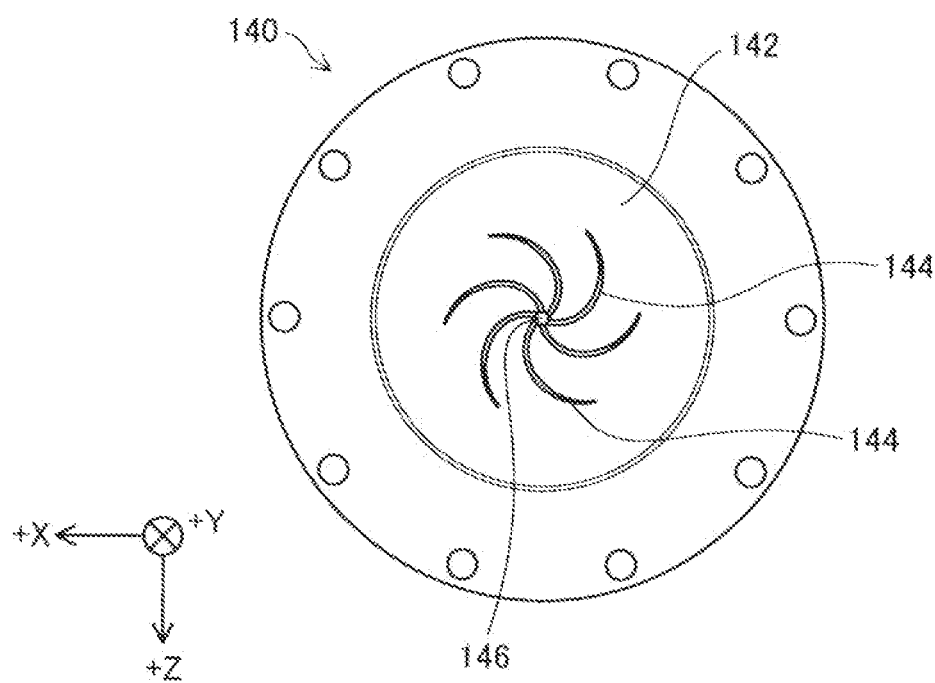
FIG. 3 is an explanatory diagram illustrating a configuration of a barrel on a side of a facing surface.

FIG. 3 is an explanatory diagram illustrating a configuration of the barrel 140 on a side of a facing surface 142. The barrel 140 has the facing surface 142 that faces the groove forming surface 132 of the screw 130. A communication hole 146 that communicates with a nozzle 150 is provided in the center of the facing surface 142. A plurality of guide grooves 144 are provided around the communication hole 146 on the facing surface 142. One end of each of the guide grooves 144 is connected to the communication hole 146 and extends in a swirling shape from the communication hole 146 toward the outer circumference of the facing surface 142. Each of the guide grooves 144 has a function of guiding the shaping material to the communication hole 146. The guide groove 144 may not be formed in the barrel 140.

As illustrated in FIG. 1, the barrel 140 is provided with a heater 148. The heater 148 heats the plasticizing portion 100. In the present embodiment, the heater 148 is constituted by four rod shape heaters provided inside the barrel 140. The output of the heater 148 is controlled by the control portion 500. The material supplied between the screw 130 and the barrel 140 is plasticized by being heated by the heater 148 while being sheared by the rotation of the screw 130.

The nozzle 150 has a cylindrical shape extending along the Y direction. The nozzle 150 communicates with the communication hole 146 and supplies the plasticized material flowing out from the communication hole 146 to the measurement injection portion 200. A check valve 152 is provided in a flow path inside the nozzle 150. The check valve 152 prevents the backflow of the plasticized material from the nozzle 150 to the screw 130. The check valve 152 may be provided in the communication hole 146 instead of the nozzle 150.

The molding mold 20 has a first mold 21 and a second mold 22. In the present embodiment, a cavity 23 is formed in the second mold 22. The first mold 21 is disposed on the side of the plasticizing portion 100, and the second mold 22 is disposed on the side of the first drive portion 300. The first mold 21 is formed with a spool 24 for pouring the plasticized material into the cavity 23. The first mold 21 and the second mold 22 are formed of metal or resin. When the first mold 21 and the second mold 22 are made of metal, the molding mold 20 is also referred to as a metal mold. It can be said that the first mold 21 is a fixed mold and the second mold 22 is a movable mold.

The first mold 21 and the second mold 22 are configured to be movable along a tie rod 400 that extends in the Y direction. The second mold 22 is connected to the first drive portion 300 via a ball screw 310 and a second speed reducer 320. The first drive portion 300 in the present embodiment is constituted by a motor. The first drive portion 300 is driven under the control of the control portion 500. By the control portion 500 to drive the first drive portion 300, the second mold 22 is moved in the Y direction along the tie rod 400. The second mold 22 moves toward the first mold 21 by the first drive portion 300, and the mold clamping is performed on the first mold 21 and the second mold 22 by contacting the second mold 22 with the first mold 21. After the mold clamping is performed, by further driving the first drive portion 300, the first mold 21 is moved to the side of the plasticizing portion 100 together with the second mold 22.

The measurement injection portion 200 is disposed between the plasticizing portion 100 and the molding mold 20. The measurement injection portion 200 has a function of measuring the plasticized material and injecting the measured plasticized material into the molding mold. The measurement injection portion 200 is fixed to the surface of the first mold 21 on the side of the plasticizing portion 100. The measurement injection portion 200 includes a storage chamber 210 in which the plasticized material is stored. The storage chamber 210 is formed in a cylindrical shape, and the internal space thereof communicates with the spool 24 formed in the first mold 21. The nozzle 150 is inserted into the storage chamber 210. By supplying the plasticized material from the nozzle 150 to the storage chamber 210, the measurement of the plasticized material is performed. The measurement injection portion 200 is configured to be movable together with the first mold 21. The volume of the internal space of the storage chamber 210 changes according to the change in the relative position of the measurement injection portion 200 with respect to the nozzle 150. When the measurement injection portion 200 is moved in the -Y direction together with the first mold 21 and the second mold 22, the nozzle 150 functions as a piston, and the plasticized material that is measured inside the storage chamber 210 is injected into the cavity 23 through the spool 24.

The measurement injection portion 200 includes a pressure detection portion 220 that detects the pressure inside the storage chamber 210. Further, the measurement injection portion 200 includes a temperature detection portion 230 that detects the temperature inside the storage chamber 210. The pressure detection portion 220 is constituted by a pressure sensor, and the temperature detection portion 230 is constituted by a temperature sensor. The pressure detection portion 220 and the temperature detection portion 230 are connected to the control portion 500.

The measurement injection portion 200 is provided with a heating portion 240. The output of the heating portion 240 is controlled by the control portion 500. The control portion 500 controls the heating portion 240 so that the temperature inside the measurement injection portion 200 which is detected by the temperature detection portion 230, that is, the temperature of the plasticized material being measured is constant.

Between the first mold 21 and the plasticizing portion 100, a first force applying portion 410 is provided that applies a force in a direction of pulling the first mold and the measurement injection portion 200, and the plasticizing portion 100 away from each other. The first force applying portion 410 according to the present embodiment is constituted by a compression coil spring. The tie rod 400 is inserted in the center of the compression coil spring that constitutes the first force applying portion 410. When the mold clamping is not performed, by energizing the first mold 21 in the +Y direction by the first force applying portion 410, the first mold 21 is disposed with a predetermined interval with respect to the plasticizing portion 100. The interval is defined by the position of the stopper 25 that limits the movement of the first mold 21 in the +Y direction.

The control portion 500 is constituted by a computer including one or a plurality of processors and memories. The control portion 500 executes the injection molding process described later by executing a program stored in the memory by the processor. A notification portion 510 is connected to the control portion 500. In the present embodiment, the notification portion 510 includes a display device. The control portion 500 notifies an operator of error information or the like by controlling the notification portion 510. The notification portion 510 may include a voice output device in place of or in addition to the display device, and notify the operator of the error by voice.

Figure 4:
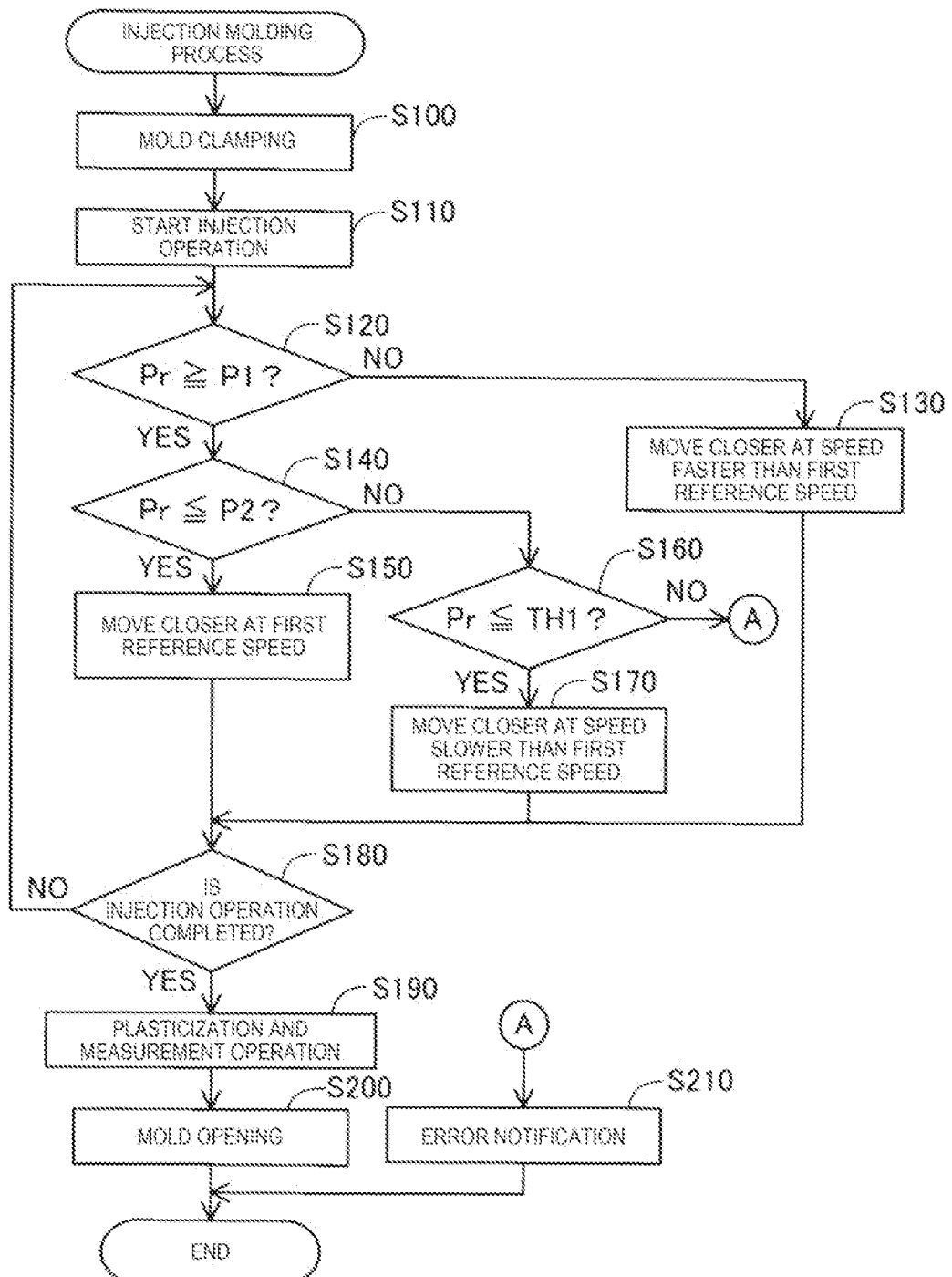
FIG. 4 is a flowchart of an injection molding process according to the first embodiment.

FIG. 4 is a flowchart of the injection molding process as an example of a method executed by the injection molding apparatus 10. The control portion 500 repeatedly executes the injection molding process by controlling the plasticizing portion 100 and the first drive portion 300 described above. In the present embodiment, at the start of the injection molding process, it is assumed that the measurement and the mold opening are completed by the previous execution of the injection molding process. By executing the injection molding process illustrated in FIG. 4 once for the first time, it is possible to perform the measurement and the mold opening.

Figure 5:
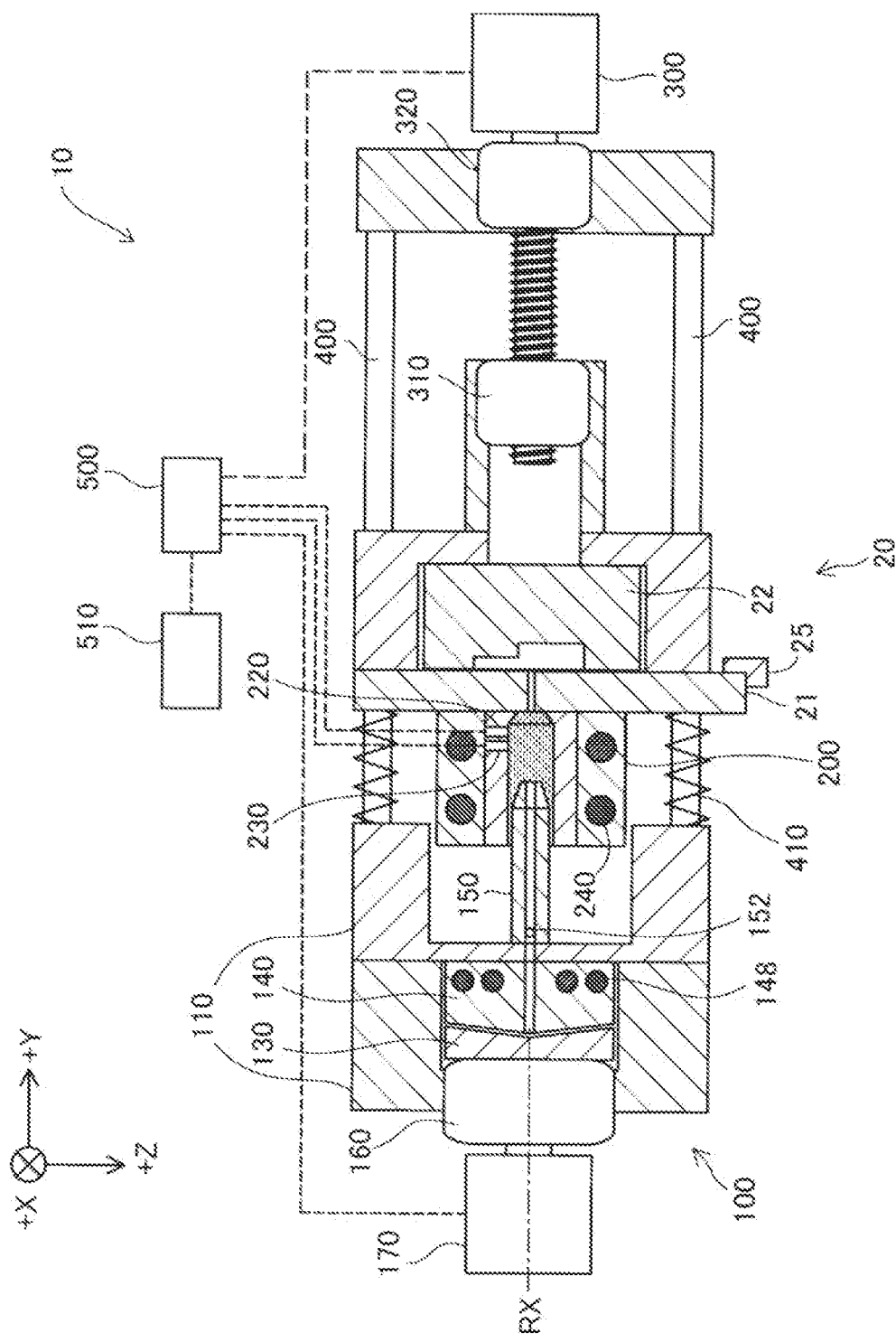
FIG. 5 is a diagram illustrating a state in which mold clamping is performed.

In step S100, the control portion 500 performs the mold clamping. Specifically, the control portion 500 performs the mold clamping by controlling the first drive portion 300 to move the second mold 22 toward the first mold 21 energized to the side of the second mold 22 by the first force applying portion 410. FIG. 5 is a diagram illustrating a state in which the mold clamping is performed. The mold clamping force in the present embodiment is defined by a relationship between a force for moving the second mold 22 by the first drive portion 300 and a force with which the first mold 21 is energized toward the second mold 22 side by the first force applying portion 410. Therefore, the operator can adjust the mold clamping force by changing a spring constant of the coil spring constituting the first force applying portion 410.

When the mold clamping is completed, in step S110, the control portion 500 starts the injection operation so as to be linked with the mold clamping operation. Specifically, after driving the first drive portion 300 in the mold clamping operation, by further driving the first drive portion 300, the control portion 500 moves the plasticizing portion 100 and the measurement injection portion 200 in a direction approaching each other with a first reference speed. Thereafter, by the nozzle 150 functioning as a piston, the plasticized material inside the measurement injection portion 200 is injected into the cavity 23 through the spool 24. In the present embodiment, as described below, in the injection operation, the relative movement speed between the plasticizing portion 100 and the measurement injection portion 200 is controlled depending on the pressure Pr inside the measurement injection portion 200. The process from step S110 to step S180 described below is also referred to as an injection step.

In step S120, the control portion 500 determines whether the pressure Pr inside the measurement injection portion 200 is equal to or larger than a first reference value P1. In step S120, when it is determined that the pressure Pr is not equal to or larger than the first reference value P1, that is, when the pressure Pr is less than the first reference value P1, in step S130, the control portion 500 performs the injection by controlling the first drive portion 300 to move the measurement injection portion 200 closer to the plasticizing portion 100 at a speed faster than the first reference speed. The first reference speed is predetermined as a movement speed at which the ideal pressure for filling the cavity 23 with the plasticized material without gaps is generated.

In step S120, when it is determined that the pressure Pr is equal to or larger than the first reference value P1, in step S140, the control portion 500 determines whether the pressure Pr is equal to or less than a second reference value P2. In step S140, when it is determined that the pressure Pr is equal to or less than the second reference value P2, in step S150, the control portion 500 performs the injection by moving the measurement injection portion 200 closer to the plasticizing portion 100 at the first reference speed. That is, in the injection operation, when the pressure Pr is equal to or larger than the first reference value P1 and equal to or less than the second reference value P2, the control portion 500 performs the injection by moving the measurement injection portion 200 closer to the plasticizing portion 100 at the first reference speed.

In step S140, when it is determined that the pressure Pr is not equal to or less than the second reference value P2, that is, the pressure Pr is larger than the second reference value, in step S160, the control portion 500 further determines whether the pressure Pr is equal to or less than a first threshold value. In step S160, when it is determined that the pressure Pr is equal to or less than the first threshold value, in step S170, the control portion 500 performs the injection by moving the measurement injection portion 200 closer to the plasticizing portion 100 at a speed slower than the first reference speed. In contrast to this, in step S160, when it is determined that the pressure Pr is not equal to or less than the first threshold value, that is, the pressure Pr exceeds the first threshold value, the control portion 500 stops the injection operation and shifts the process to step S210. In step S210, the notification portion 510 is controlled, an error is notified representing that the injection cannot be performed properly, and the injection molding process is ended.

Figure 6:
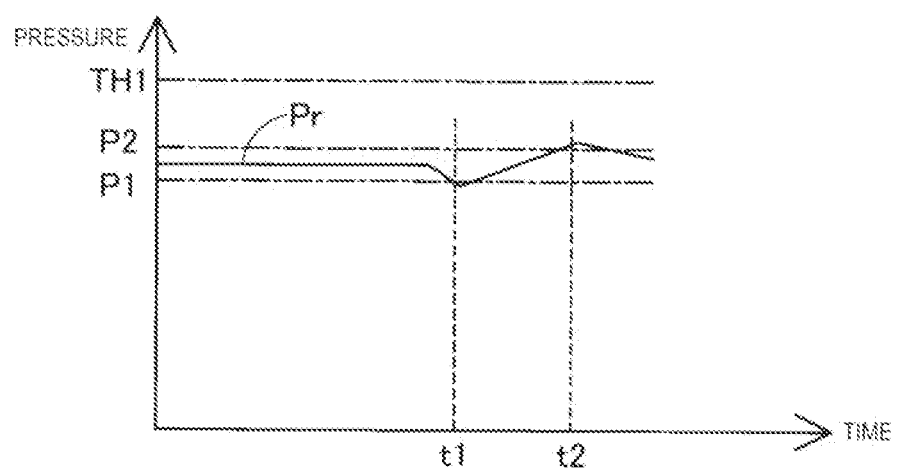
FIG. 6 is a graph illustrating an example of a change in pressure in an injection operation.

FIG. 6 is a graph illustrating an example of a change in pressure Pr in the injection operation. In FIG. 6, the change in pressure Pr with respect to time t is indicated by a solid line. Further, the first reference value P1 and the second reference value P2 to be compared with the pressure Pr are indicated by an alternate long and short dash line. The second reference value P2 is a value larger than the first reference value P1. The first reference value P1 and the second reference value P2 are predetermined, for example, as pressure values for accurately molding the molded product.

As illustrated in FIG. 6, at the time t1, the pressure Pr is below the first reference value P1. At this time, when the measurement injection portion 200 is moved at the first reference speed, the amount of the plasticized material injected from the measurement injection portion 200 into the cavity 23 is smaller than when the pressure Pr is a value that is equal to or larger than the first reference value P1 and equal to or less than the second reference value P2. Therefore, the control portion 500 moves the measurement injection portion 200 at a speed faster than the first reference speed by executing step S130 at the time t1. By doing so, it is possible to suppress a shortage of the amount of injection of the plasticized material that is injected into the cavity 23. The shortage of the amount of injection of the plasticized material may be referred to as insufficient filling.

At time t2, the pressure Pr exceeds the second reference value P2. At this time, when the measurement injection portion 200 is moved at the first reference speed, the plasticized material is injected into the cavity 23 at a higher pressure than when the pressure Pr is a value that is equal to or larger than the first reference value P1 and equal to or less than the second reference value P2. When the plasticized material is injected into the cavity 23 at a pressure higher than the proper pressure, stress may remain inside the molded product and the strength of the molded product may decrease. The control portion 500 moves the measurement injection portion 200 at a speed slower than the first reference speed by executing the step S170 at the time t2, thereby it is possible to suppress the shaping material being injected into the cavity 23 due to excessive pressure. The stress remaining in the molded product may be referred to as residual stress.

The change in pressure Pr at the time t1 or the time t2 occurs due to, for example, a change in the amount or state of the plasticized material inside the measurement injection portion 200. Further, there may be a case where the pressure Pr changes depending on the shape of the cavity 23. For example, when the plasticized material injected into the cavity 23 passes through a part of the cavity 23 having a small flow path cross-sectional area, there may be a case where the pressure Pr is larger than when the plasticized material passes through the part of the cavity 23 having a large flow path cross-sectional area. According to steps S120 to S170 described above, the movement speed of the measurement injection portion 200 is adjusted such that the pressure Pr falls between the first reference value P1 and the second reference value P2. However, when the pressure Pr exceeds the first threshold value TH1 for some reason due to an abnormality of the plasticizing portion 100 or the like, the injection operation is stopped and the error is notified by the notification portion 510. The first threshold value TH1 is predetermined as a value at which the pressure increases as molding abnormality occurs.

Figure 7:
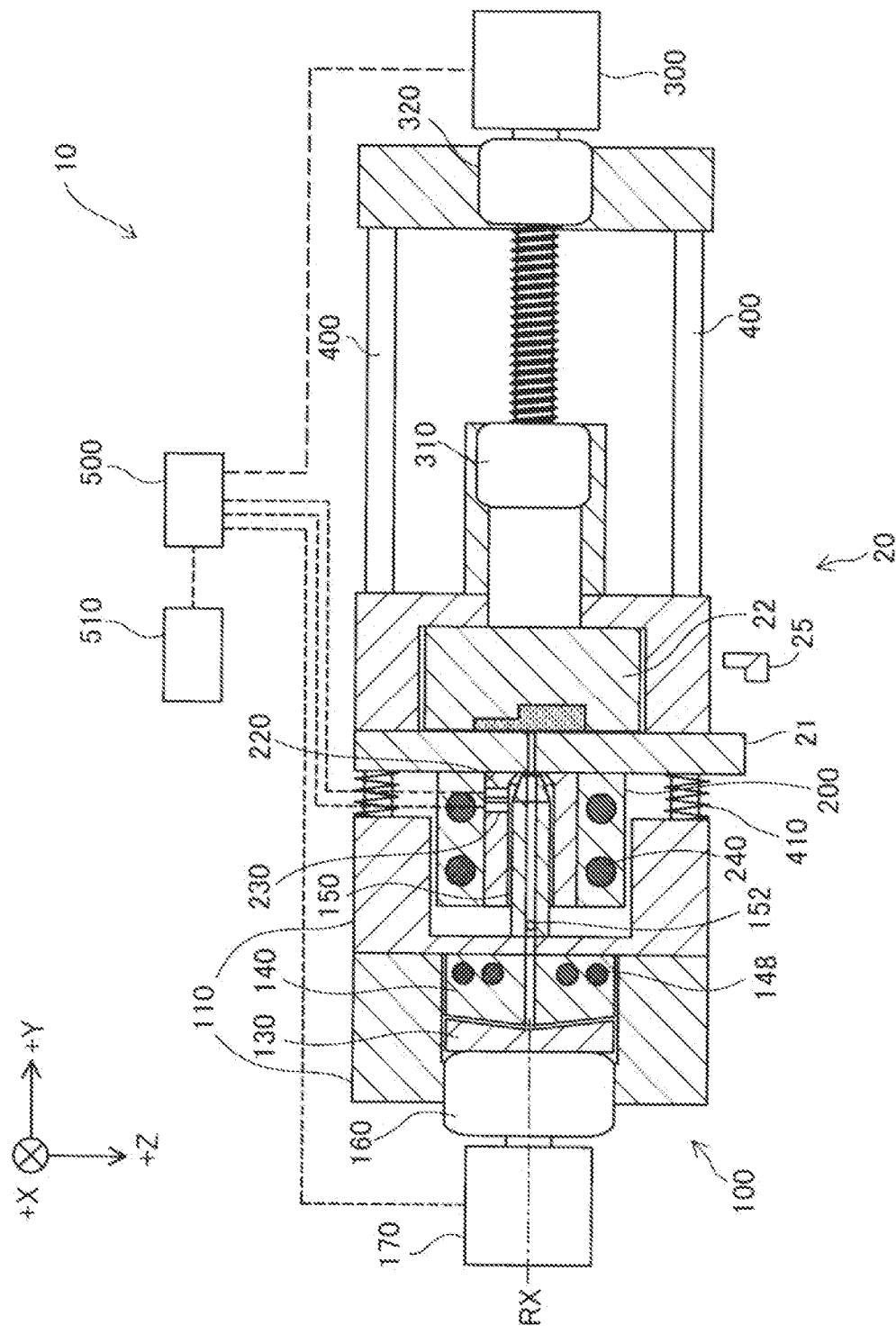
FIG. 7 is a diagram illustrating a state in which the injection operation is completed.

In step S180, the control portion 500 determines whether the injection operation is completed. The control portion 500 determines that the injection operation is completed when the amount of movement of the measurement injection portion 200 reaches a predetermined distance. FIG. 7 illustrates a state in which the injection operation is completed. As illustrated in FIG. 7, in a state where the injection operation is completed, the molding mold 20 is filled with the plasticized material. In step S180, when it is determined that the injection operation is not completed, the control portion 500 returns the process to step S120 to continue the injection operation.

Figure 8:
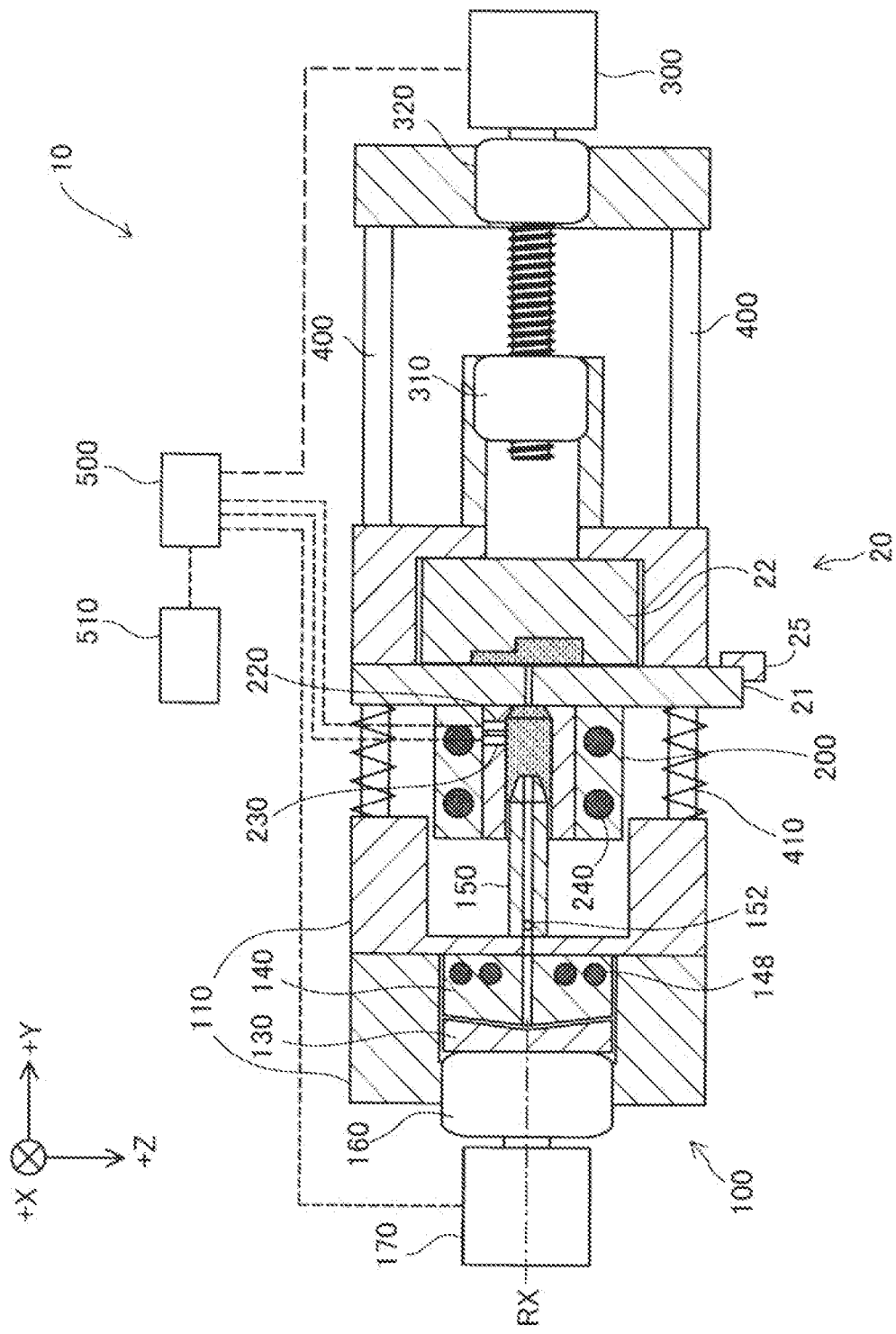
FIG. 8 is a diagram illustrating a state in which a measurement operation is completed.

In step S180, when it is determined that the injection operation is completed, the control portion 500 executes the plasticization and the measurement operation in step S190 after performing the pressure holding for a predetermined time. Specifically, while controlling the plasticizing portion 100 to produce the plasticized material, the control portion 500 performs the measurement by controlling the first drive portion 300 to move the plasticizing portion 100 and the measurement injection portion 200 in a direction away from each other. FIG. 8 illustrates a state in which the measurement operation is completed. As illustrated in FIG. 8, in a state where the measurement operation is completed, the molded product is molded inside the cavity 23, and the plasticized material is stored inside the measurement injection portion 200. The process of step S190 is also referred to as a measurement step.

Figure 9:
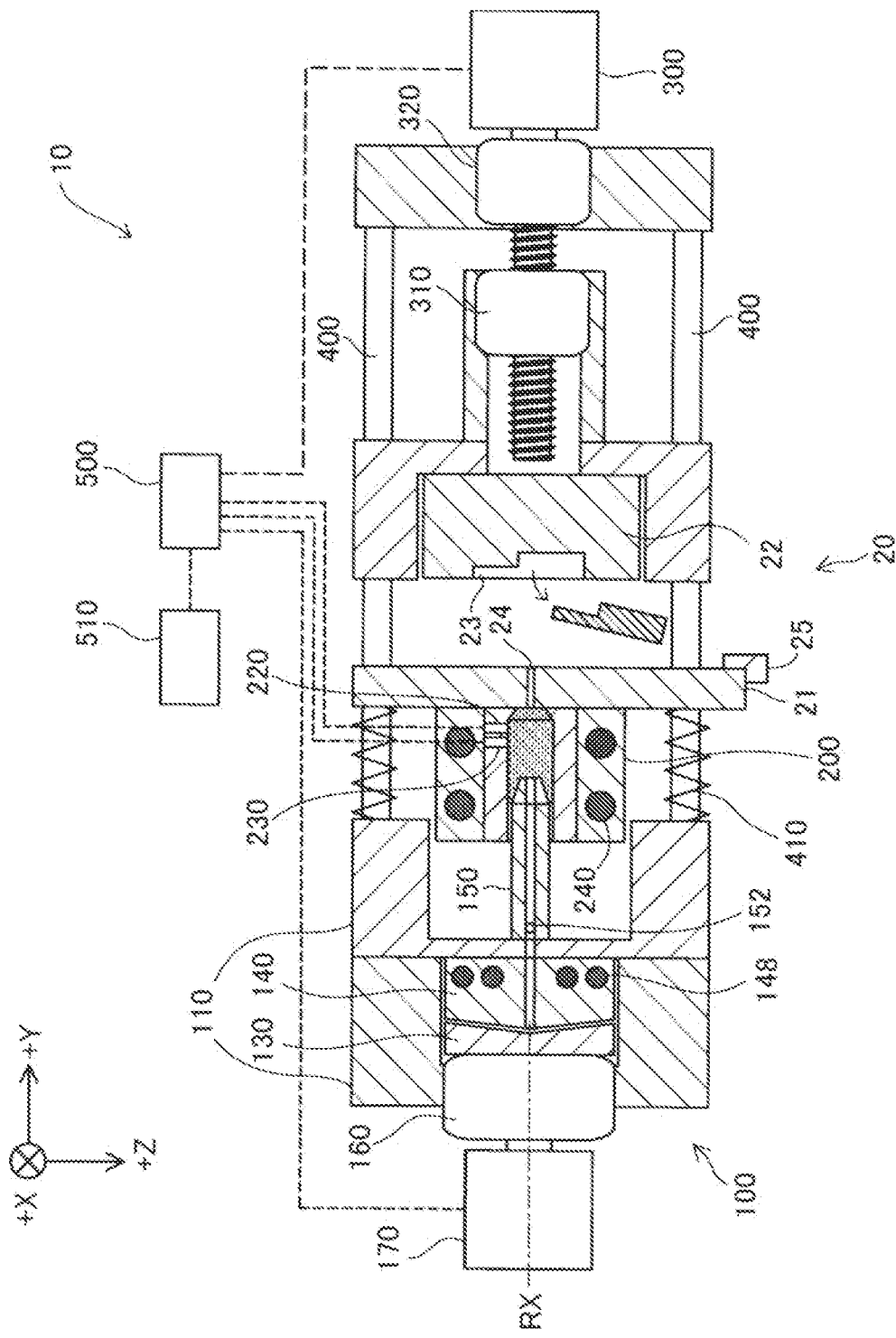
FIG. 9 is a diagram illustrating a state in which mold opening is performed.

After the measurement operation is completed, in step S200, the control portion 500 performs the mold opening so as to be linked with the measurement operation. Specifically, after driving the first drive portion 300 in the measurement operation, the control portion 500 performs the mold opening by further driving the first drive portion 300 to move the second mold 22 away from the first mold 21. FIG. 9 illustrates a state in which the mold opening is performed. In the mold opening, as an ejector pin (not illustrated) protrudes into the cavity 23 as the second mold 22 moves, the molded product is released from the cavity 23.

The control portion 500 can continuously mold the molded product by repeatedly executing the series of injection molding processes described above.

According to the injection molding apparatus 10 of the first embodiment described above, the measurement injection portion 200 is disposed between the plasticizing portion 100 and the molding mold 20, and the measurement injection portion 200 is configured such that the volume of the internal space in which the plasticized material is stored changes according to the change in the relative position between the measurement injection portion and the plasticizing portion 100. Therefore, in the present embodiment, the operations of mold clamping and injection and the operations of measurement and mold opening can be performed so as to be linked by the same first drive portion 300. Therefore, since the configuration of the injection molding apparatus 10 can be simplified, the injection molding apparatus 10 can be miniaturized and the cost can be reduced, and the injection molding can be efficiently performed by the same first drive portion 300.

Further, in the present embodiment, the injection operation is executed while controlling the relative movement speed between the plasticizing portion 100 and the measurement injection portion 200 based on the pressure Pr inside the measurement injection portion 200 that is detected by the pressure detection portion 220. Therefore, even when the amount or state of the plasticized material inside the measurement injection portion 200 changes, the injection accuracy of the plasticized material is maintained high. Therefore, the molding quality can be improved.

Further, in the present embodiment, in the injection operation, when the pressure Pr inside the measurement injection portion 200 exceeds the first threshold value TH1, the injection operation is stopped and the notification is performed by using the notification portion 510. Therefore, for example, it is possible to suppress the occurrence of molding defects due to abnormally high pressure of the injected plasticized material. As a result, the molding quality can be improved.

Further, in the present embodiment, since the measurement injection portion 200 is provided with the heating portion 240, it is possible to suppress a decrease in the temperature of the plasticized material inside the measurement injection portion 200. Further, in the present embodiment, by controlling the heating portion 240, the temperature of the measured plasticized material can be maintained at a constant temperature. Therefore, the molding quality can be improved.

Further, in the present embodiment, the first force applying portion 410, which applies a force in a direction of pulling the measurement injection portion 200 and the plasticizing portion 100 away from each other, is provided between the plasticizing portion 100 and the first mold 21. Therefore, the mold clamping force can be adjusted by the first force applying portion.

Further, in the present embodiment, since the screw 130 that constitutes the plasticizing portion 100 has a substantially cylindrical shape in which the height in the direction along the central axis RX is smaller than the diameter, the injection molding apparatus 10 can be further miniaturized.

B. Second Embodiment

Figure 10:
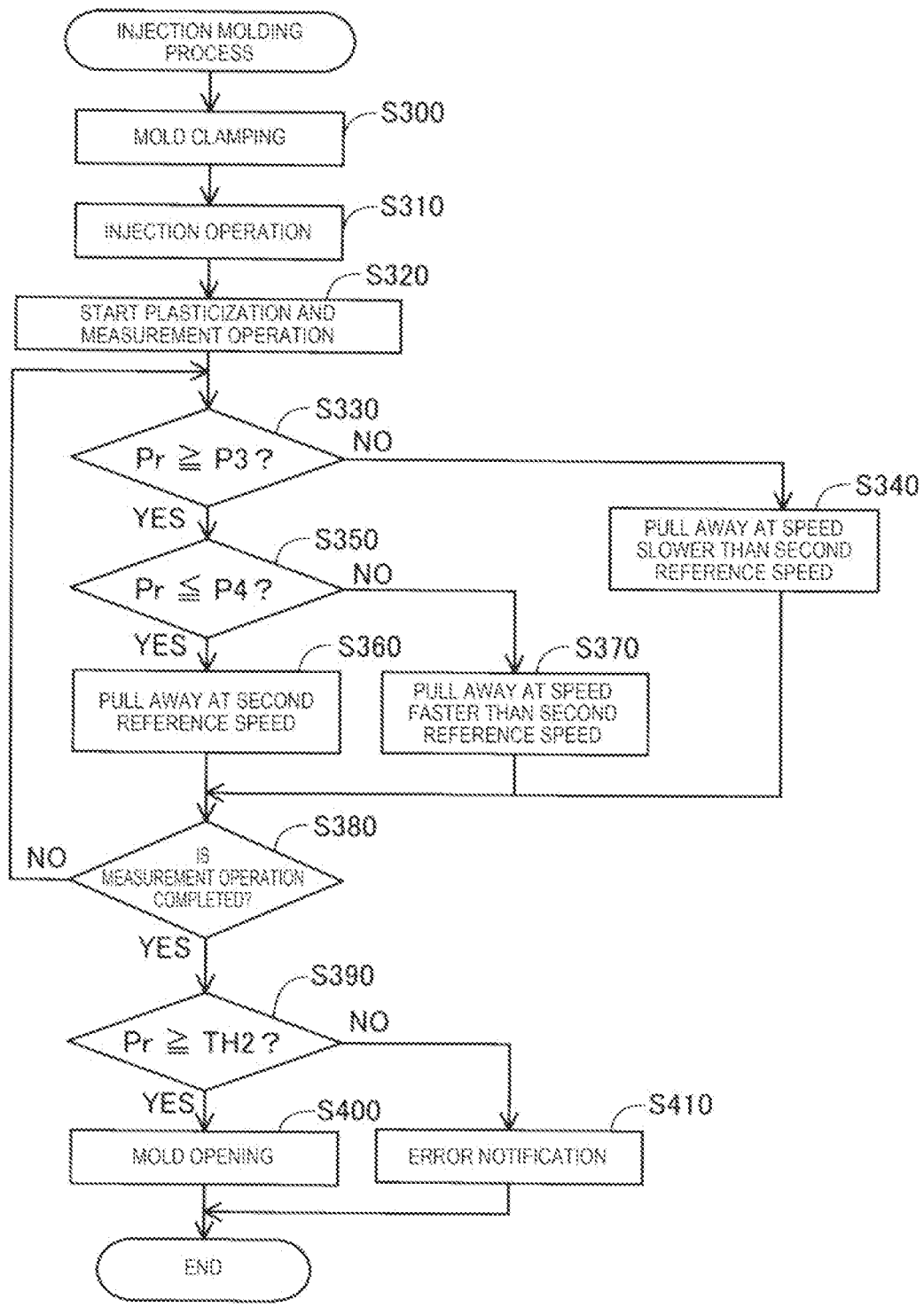
FIG. 10 is a flowchart of an injection molding process according to a second embodiment.

FIG. 10 is a flowchart of the injection molding process according to a second embodiment. The configuration of the injection molding apparatus 10 in the second embodiment is the same as that in the first embodiment. In the first embodiment, the injection operation is performed according to the pressure Pr inside the measurement injection portion 200, whereas in the second embodiment, the measurement operation is performed depending on the pressure Pr as described below. In the second embodiment, as in the first embodiment, at the start of the injection molding process, it is assumed that the measurement and the mold opening are completed by the execution of the previous injection molding process.

In step S300, the control portion 500 performs the mold clamping in the same manner as in the first embodiment. Subsequently, in step S310, the control portion 500 executes the injection operation. In the injection operation in the second embodiment, similar to the first embodiment, the movement speed of the measurement injection portion 200 may be adjusted depending on the pressure Pr, or the measurement injection portion 200 may be moved at a constant speed regardless of the pressure Pr. The process of step S310 corresponds to the injection step in the second embodiment.

In step S320, the control portion 500 starts a material plasticization and measurement operation. In the present embodiment, the control portion 500 moves the plasticizing portion 100 and the measurement injection portion 200 in a direction away from each other with the second reference speed by controlling the first drive portion 300, and causes the measurement injection portion 200 to measure the plasticized material by supplying the plasticized material from the nozzle 150 into the measurement injection portion 200. In the present embodiment, as described below, in the measurement operation, the relative movement speed between the plasticizing portion 100 and the measurement injection portion 200 is controlled depending on the pressure Pr inside the measurement injection portion 200. The process from step S320 to step S380 described below corresponds to the measurement step in the second embodiment.

In step S330, the control portion 500 determines whether the pressure Pr is equal to or larger than a third reference value P3. In step S330, when it is determined that the pressure Pr is not equal to or larger than the third reference value P3, that is, when the pressure Pr is less than the third reference value P3, in step S340, the control portion 500 performs the measurement by controlling the first drive portion 300 to move the measurement injection portion 200 so as to be pulled away from the plasticizing portion 100 at a speed slower than the second reference speed. The second reference speed is predetermined, for example, as the movement speed at which the plasticized material can be accurately measured.

In step S330, when it is determined that the pressure Pr is equal to or larger than the third reference value P3, in step S350, the control portion 500 determines whether the pressure Pr is equal to or less than a fourth reference value P4. In step S350, when it is determined that the pressure Pr is equal to or less than the fourth reference value P4, in step S360, the control portion 500 performs the measurement by moving the measurement injection portion 200 so as to be pulled away from the plasticizing portion 100 at the second reference speed. That is, in the measurement operation, when the pressure Pr is equal to or larger than the third reference value P3 and equal to or less than the fourth reference value P4, the control portion 500 performs the measurement by moving the measurement injection portion 200 so as to be pulled away from the plasticizing portion 100 at the second reference speed.

In step S350, when it is determined that the pressure Pr is not equal to or less than the fourth reference value P4, that is, when the pressure Pr exceeds the fourth reference value P4, in step S370, the control portion 500 performs the measurement by moving the measurement injection portion 200 so as to be pulled away from the plasticizing portion 100 at a speed faster than the second reference speed.

Figure 11:
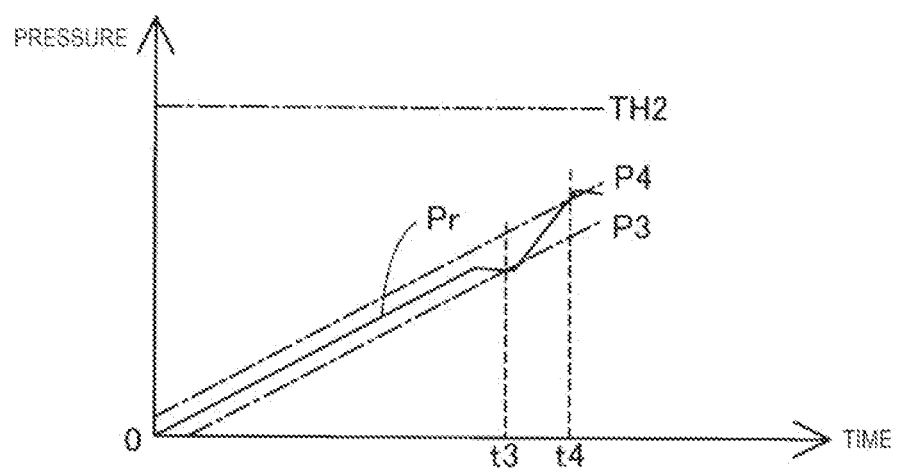
FIG. 11 is a graph illustrating an example of a change in pressure in a measurement operation.

FIG. 11 is a graph illustrating an example of a change in pressure Pr in the measurement operation. In FIG. 11, the change in pressure Pr with respect to time t is indicated by a solid line. Further, the third reference value P3 and the fourth reference value P4 with respect to the time t are indicated by the alternate long and short dash line. The fourth reference value P4 is a value larger than the third reference value P3. The third reference value P3 and the fourth reference value P4 are predetermined, for example, as pressure values for accurately measuring the plasticized material.

As illustrated in FIG. 11, at the time t3, the pressure Pr is below the third reference value P3. At this time, when the measurement injection portion 200 is moved away from the plasticizing portion 100 at the second reference speed, air may be mixed into the measurement injection portion 200, for example. Therefore, the control portion 500 moves the measurement injection portion 200 at a speed slower than the second reference speed by executing step S340 at the time t3. By doing so, the mixing of air is suppressed and the measurement accuracy of the plasticized material is improved.

At time t4, the pressure Pr exceeds the fourth reference value P4. At this time, when the measurement injection portion 200 is moved away from the plasticizing portion 100 at the second reference speed, the amount of the plasticized material introduced into the measurement injection portion 200 is larger than when the pressure Pr is a value that is equal to or larger than the third reference value P3 and equal to or less than the fourth reference value P4. Therefore, the control portion 500 moves the measurement injection portion 200 at a speed faster than the second reference speed by executing step S370 at the time t4. By doing so, it is possible to suppress the excessive supply of the plasticized material into the measurement injection portion 200. The change in pressure Pr at the time t3 or the time t4 occurs due to, for example, a change in the amount or state of the plasticized material produced by the plasticizing portion 100. These changes occur, for example, due to a temperature change in the plasticizing portion 100 or the like.

In step S380, the control portion 500 determines whether the measurement operation is completed. The control portion 500 determines that the measurement operation is completed when the amount of movement of the measurement injection portion 200 reaches a predetermined distance. In step S380, when it is determined that the measurement operation is not completed, the control portion 500 returns the process to step S330 to continue the injection molding process.

In step S380, when it is determined that the measurement operation is completed, in step S390, the control portion 500 determines whether the pressure Pr inside the measurement injection portion 200 is equal to or larger than the second threshold value TH2. In step S390, when it is determined that the pressure Pr is equal to or larger than the second threshold value TH2, in step S400, the control portion 500 performs the mold opening by controlling the first drive portion 300 to move the second mold 22 so as to be pulled away from the first mold 21. On the other hand, in step S390, when it is determined that the pressure Pr is less than the second threshold value TH2, in step S410, the control portion 500 controls the notification portion 510 to notify an error representing that the measurement cannot be performed properly, and ends the injection molding process. The second threshold value TH2 is predetermined as the pressure inside the measurement injection portion 200 when the measurement is properly ended.

According to the second embodiment described above, the control portion 500 executes the measurement operation while controlling the relative movement speed between the plasticizing portion 100 and the measurement injection portion 200 based on the pressure Pr detected by the pressure detection portion 220. Therefore, even when the amount or state of the plasticized material produced by the plasticizing portion 100 changes, the measurement accuracy is maintained high. Therefore, the injection accuracy of the plasticized material is improved, and the molding quality is improved.

C. Third Embodiment

Figure 12:
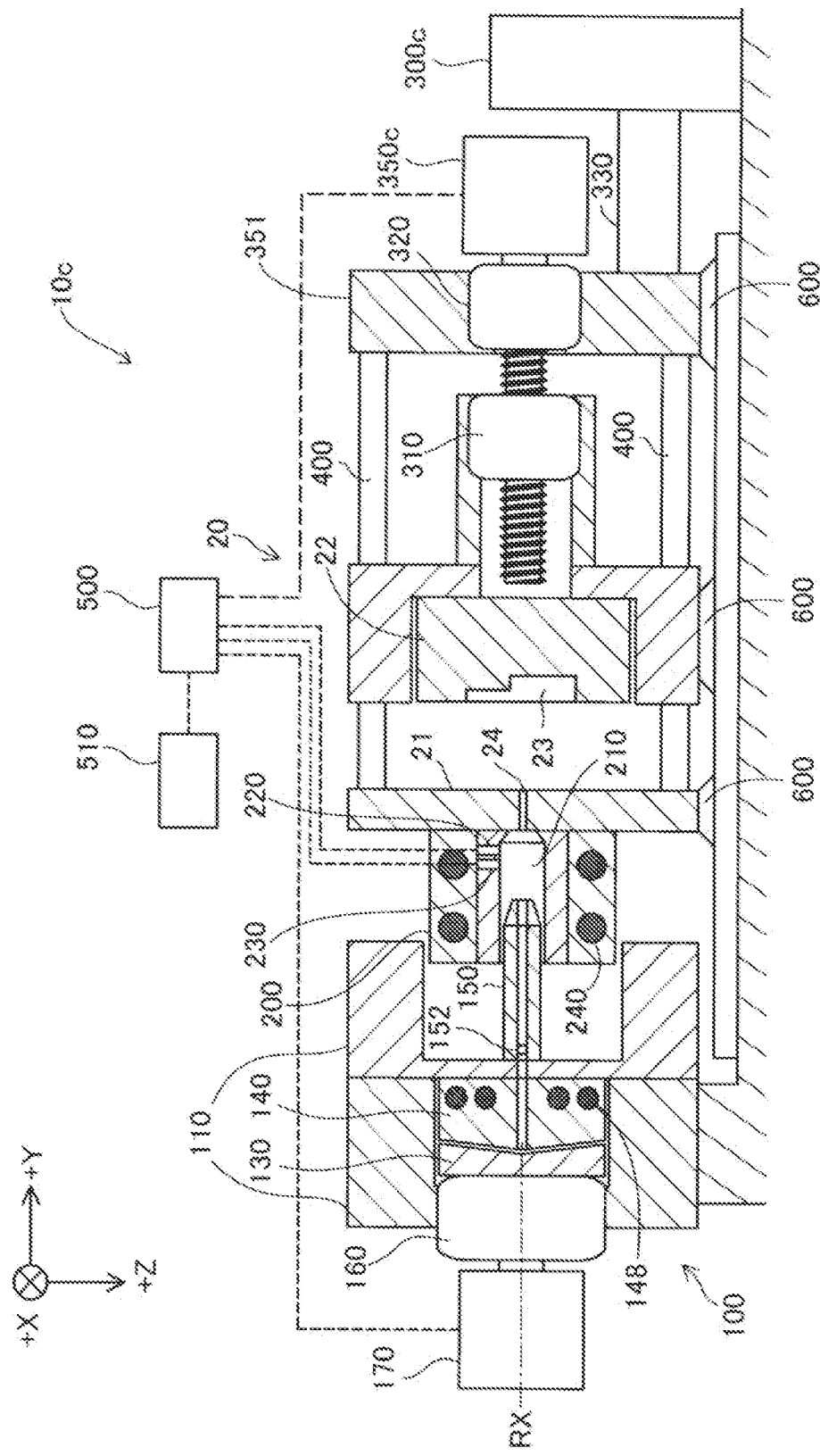
FIG. 12 is a diagram illustrating a schematic configuration of an injection molding apparatus according to a third embodiment.

FIG. 12 is a diagram illustrating a schematic configuration of an injection molding apparatus 10c according to a third embodiment. In the first embodiment, the mold clamping or the measurement operation, the injection operation, and the mold opening are performed by one first drive portion 300. That is, the first drive portion 300 in the first embodiment has a function of opening/closing the molding mold 20 in addition to a function of changing the relative positions of the plasticizing portion 100 and the measurement injection portion 200. In contrast to this, the injection molding apparatus 10c of the third embodiment includes two drive portions, a first drive portion 300c and a second drive portion 350c, and the mold clamping or measurement operation, injection operation, and mold opening are performed by these drive portions. In the third embodiment, a drive portion for performing opening/closing the molding mold 20 is the second drive portion 350c. The second drive portion 350c is connected to the second mold 22 via the second speed reducer 320 and the ball screw 310, similarly to the first drive portion 300 of the first embodiment. The first drive portion 300c in the third embodiment is a drive portion for changing the relative positions of the plasticizing portion 100 and the measurement injection portion 200. The first drive portion 300c in the third embodiment is constituted by an air cylinder. The first drive portion 300c may be constituted by a motor, a speed reducer, and a ball screw, similarly to the second drive portion 350c.

The second drive portion 350c is fixed to a fixing rack 351, and the fixing rack 351 and the first mold 21 are connected by the tie rod 400 along the Y direction so that the distance therebetween does not fluctuate. The second mold 22 is configured to be movable in the Y direction along the tie rod 400 between the first mold 21 and the fixing rack 351. Each of the first mold 21, the second mold 22, and the fixing rack 351 is supported from the lower part by the linear guide 600 and is configured to be movable in the Y direction. However, although the first mold 21 and the fixing rack 351 are configured to be movable in the Y direction, since the first mold 21 and the fixing rack 351 are connected by the tie rod 400, the distance therebetween does not change. The first mold 21, the second mold 22, and the fixing rack 351 may be supported by a rail, a wheel, or the like instead of the linear guide 600.

The first drive portion 300c includes a rod 330 that can be taken in and out along the Y direction. The front end of the rod 330 is connected to the fixing rack 351 to which the second drive portion 350c is fixed. By moving the rod 330 along the Y direction under the control of the control portion 500, the first drive portion 300c can move the first mold 21, the second mold 22, and the second drive portion 350c together along the Y direction.

Figure 13:
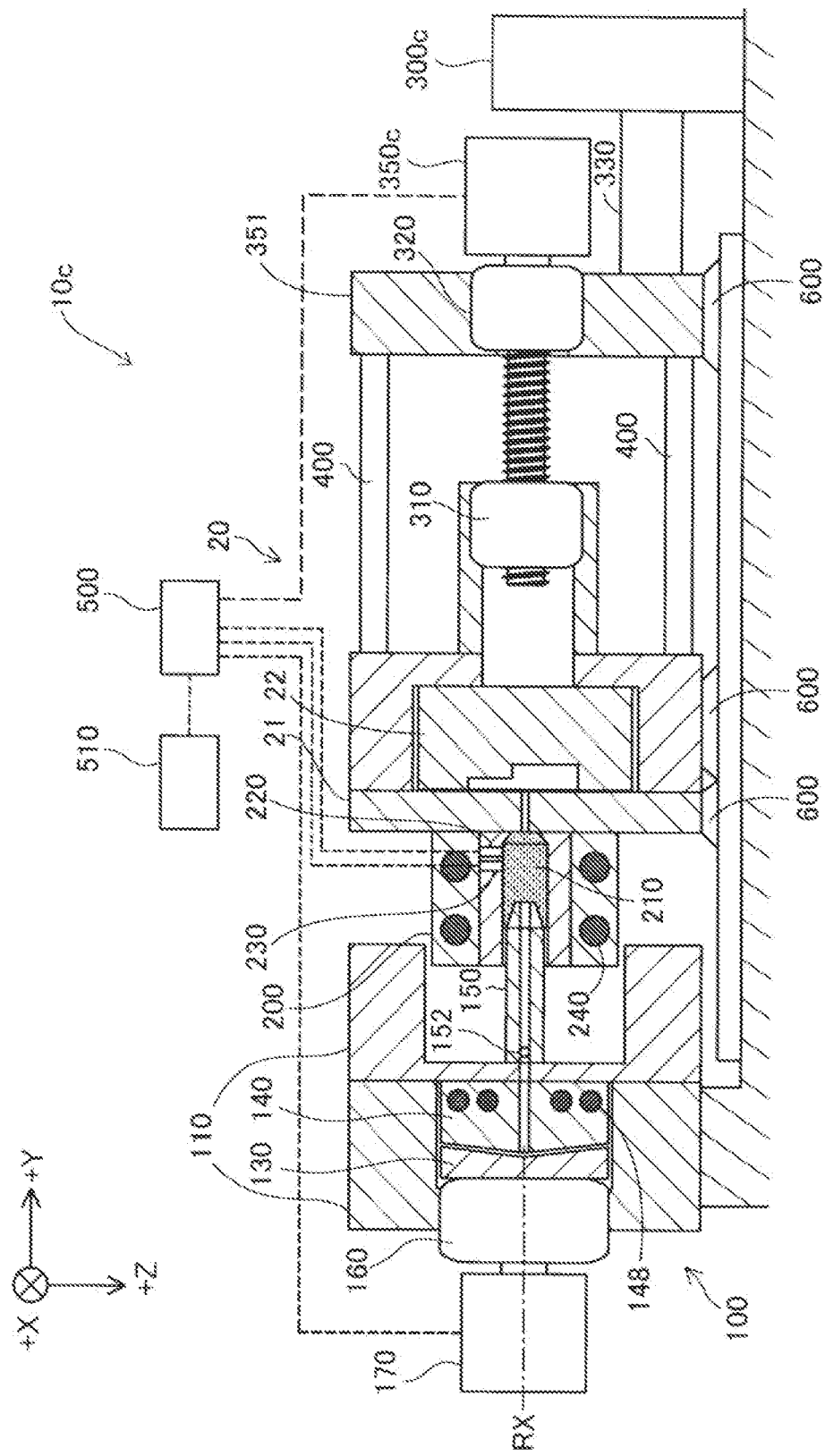
FIG. 13 is a diagram illustrating a mode in which a measurement operation is being performed.
Figure 14:
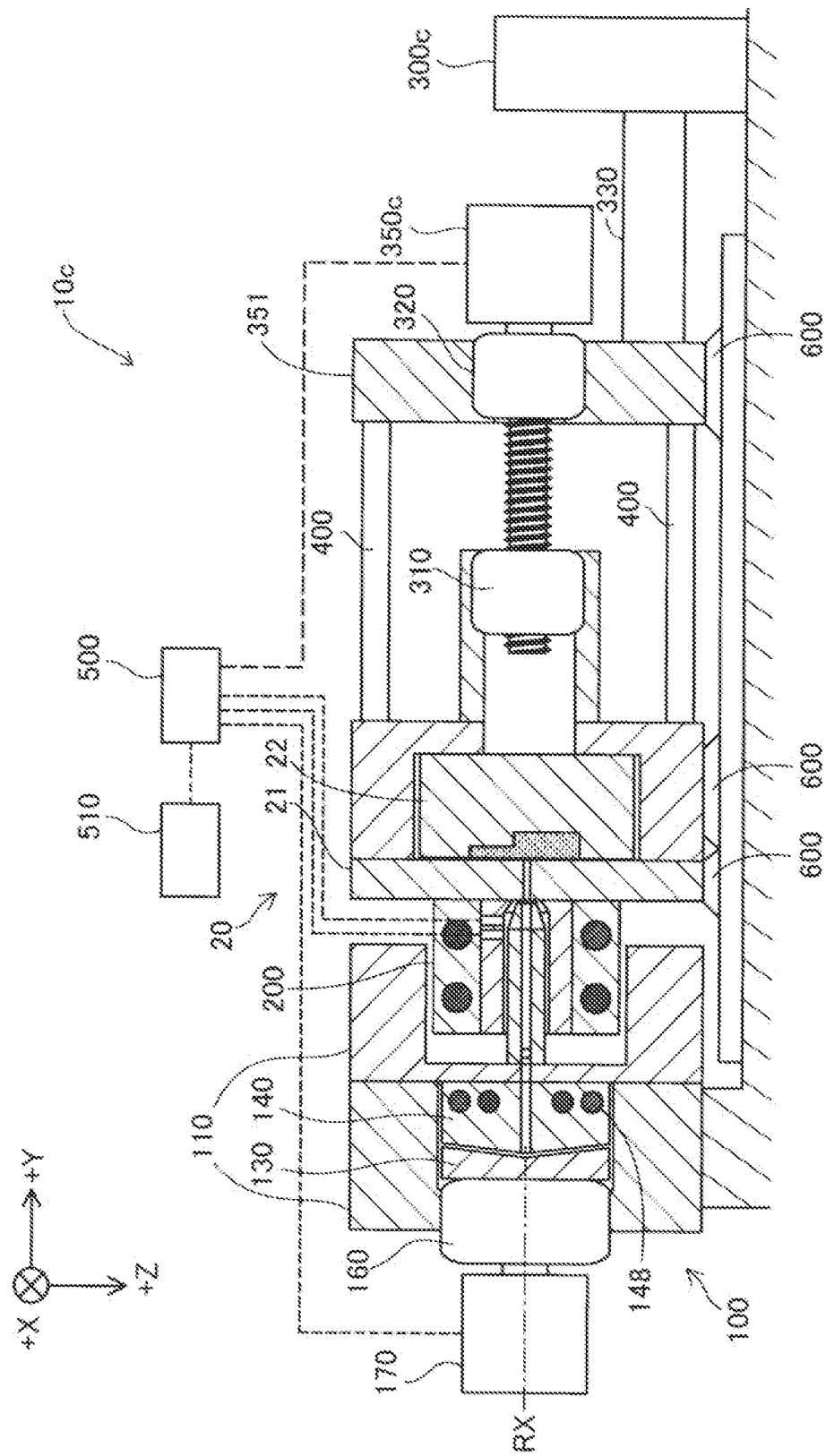
FIG. 14 is a diagram illustrating a mode in which an injection operation is being performed.

The injection molding apparatus 10c according to the third embodiment can perform the injection molding by executing the same injection molding process as that of the first embodiment or the second embodiment. However, the control portion 500 performs the mold clamping, which is in step S100 in FIG. 4 or step S300 in FIG. 10, and the mold opening, which is in step S200 in FIG. 4 or step S400 in FIG. 10, by using the second drive portion 350c to move the second mold 22 with respect to the first mold 21. Further, the control portion 500 performs the injection operation, which is in steps S110 to S180 in FIG. 4 or step S310 in FIG. 10, and the measurement operation, which is in step S190 in FIG. 4 or steps S320 to S380 in FIG. 10, by using the first drive portion 300c to move the molding mold 20 together with the second drive portion 350c with respect to the plasticizing portion 100. FIG. 13 illustrates a mode in which the measurement operation is performed by the first drive portion 300c, and FIG. 14 illustrates a mode in which the injection operation is performed by the first drive portion 300c.

According to the third embodiment described above, since the second drive portion 350c for performing the mold clamping and the mold opening, and the first drive portion 300c for performing the injection operation and the measurement operation are different drive portions, the mold clamping force can be increased by the second drive portion 350c. Further, since the degree of freedom in setting the mold clamping force and the injection pressure can be increased, the injection molding corresponding to various molding conditions can be performed.

In the third embodiment, the first drive portion 300c for changing the relative positions of the plasticizing portion 100 and the measurement injection portion 200 and the second drive portion 350c for opening/closing the molding mold 20 are different drive portions. In contrast to this, in the first embodiment described above, the first drive portion for changing the relative positions of the plasticizing portion 100 and the measurement injection portion 200 and the second drive portion for opening/closing the molding mold 20 are the same drive portion, specifically, the first drive portion 300.

D. Fourth Embodiment

Figure 15:
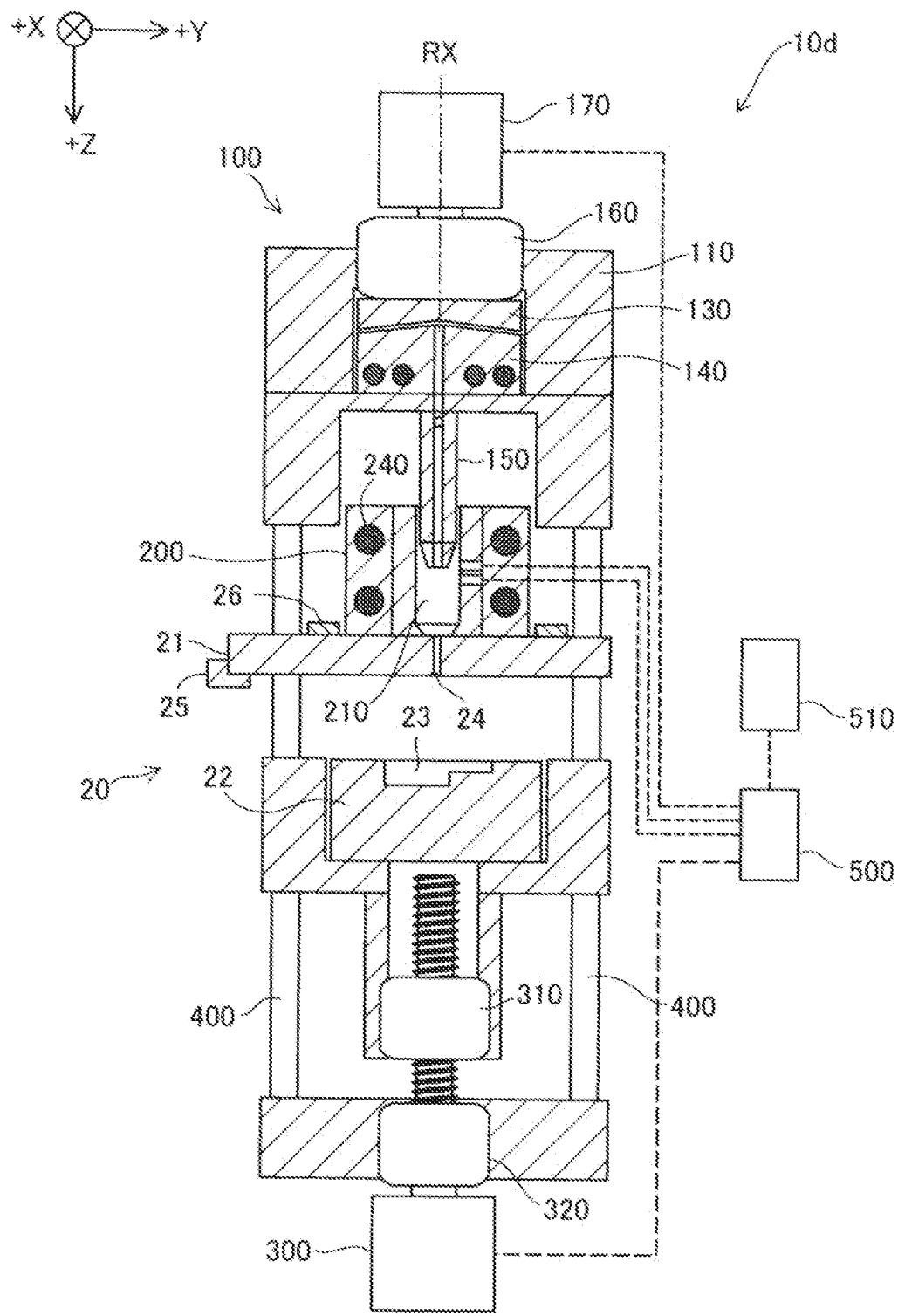
FIG. 15 is a diagram illustrating a schematic configuration of an injection molding apparatus according to a fourth embodiment.

FIG. 15 is a diagram illustrating a schematic configuration of an injection molding apparatus 10d according to a fourth embodiment. In the first embodiment described above, the direction in which the first mold 21 and the second mold 22 are moved is the horizontal direction. In contrast to this, in the fourth embodiment, the direction in which the first mold 21 and the second mold 22 are moved is the vertical direction. Specifically, the injection molding apparatus 10 in FIG. 1 is disposed vertically such that the side of the first drive portion 300 is on the lower part. With such a configuration, the first force applying portion 410 illustrated in FIG. 1 can be omitted. That is, by disposing the injection molding apparatus 10d in the vertical direction, the first mold 21 always tries to move to the second mold 22 by gravity. Therefore, even when the first force applying portion 410 that acts in the direction of pulling the first mold 21 away from the plasticizing portion 100 is not provided, it becomes possible to perform the mold clamping and the injection operation by moving the second mold 22 to the upper part. Further, when the second mold 22 is moved to the lower part by using the first drive portion 300, the first mold 21 moves to the lower part due to its own weight, so that the measurement operation can be performed according to the movement. In the present embodiment, the mold clamping force can be adjusted by changing the weights of the first mold 21 and the measurement injection portion 200 by attaching a weight 26 or the like.

E. Fifth Embodiment

Figure 16:
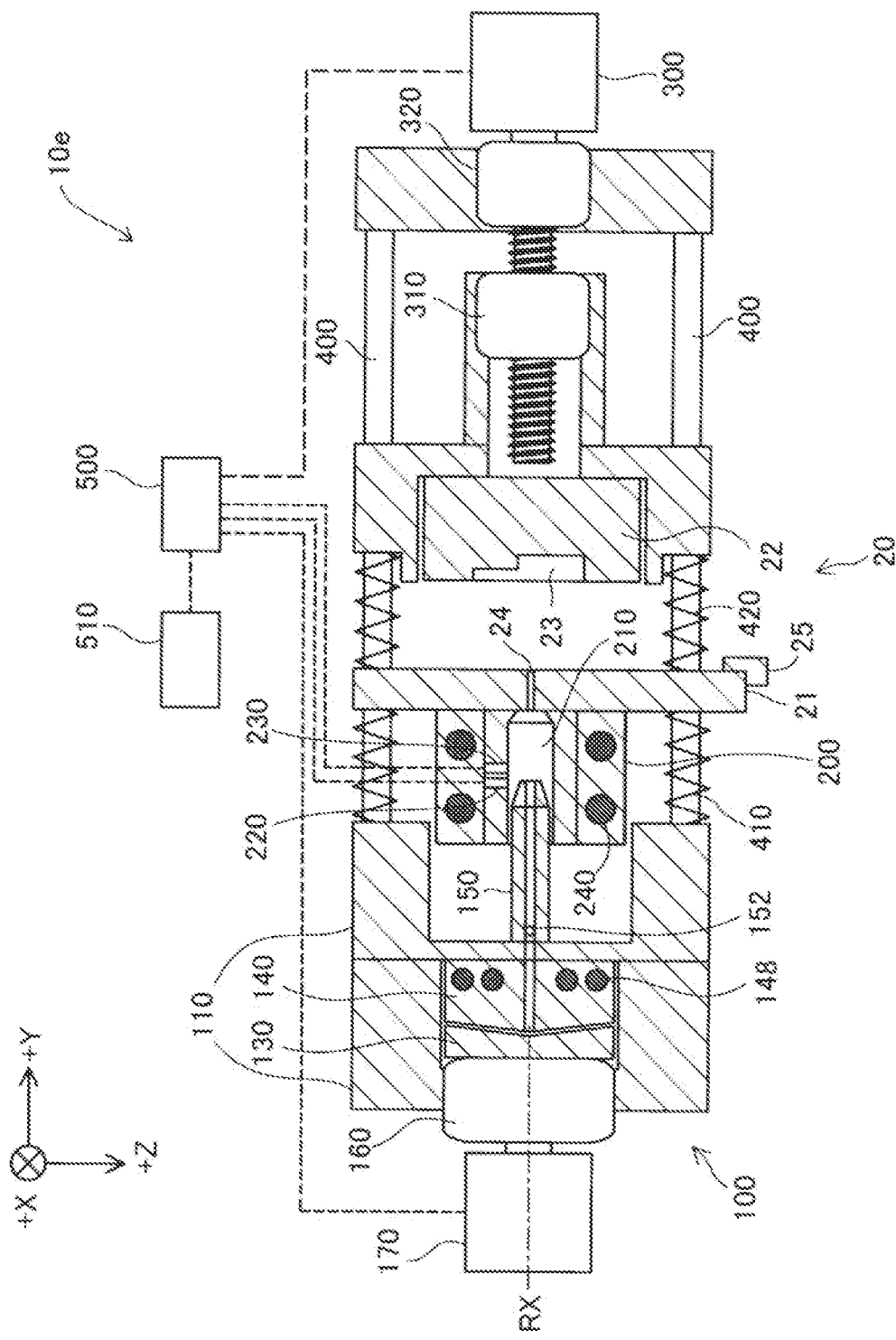
FIG. 16 is a diagram illustrating a schematic configuration of an injection molding apparatus according to a fifth embodiment.

FIG. 16 is a diagram illustrating a schematic configuration of an injection molding apparatus 10e according to a fifth embodiment. The injection molding apparatus 10e of the fifth embodiment includes a second force applying portion 420 that applies a force between the first mold 21 and the second mold 22 in a direction in which the first mold 21 and the second mold 22 are pulled away from each other. Other configurations of the injection molding apparatus 10e are the same as those of the first embodiment. A compression coil spring can be used as the second force applying portion 420. With such a configuration, since the mold clamping can be gradually performed while bringing the first mold 21 closer to the plasticizing portion 100, it is possible to start the injection operation before the mold clamping is completed for the molding mold 20. As a result, for example, a low-pressure injection molding can be performed by setting the spring constants of the first force applying portion 410 and the second force applying portion 420 such that the injection operation and the mold clamping are completed almost at the same time. Further, by providing the second force applying portion 420, it becomes possible to assist the mold opening between the first mold 21 and the second mold 22 by the second force applying portion 420. The second force applying portion 420 can also be applied to the injection molding apparatus 10c of the third embodiment.

The first force applying portion 410 shown in the first embodiment and the second force applying portion 420 of the fifth embodiment are not limited to an elastic body such as a coil spring but may be configured with an actuator using a power source such as a motor that can be controlled by the control portion 500.

F. Sixth Embodiment

Figure 17:
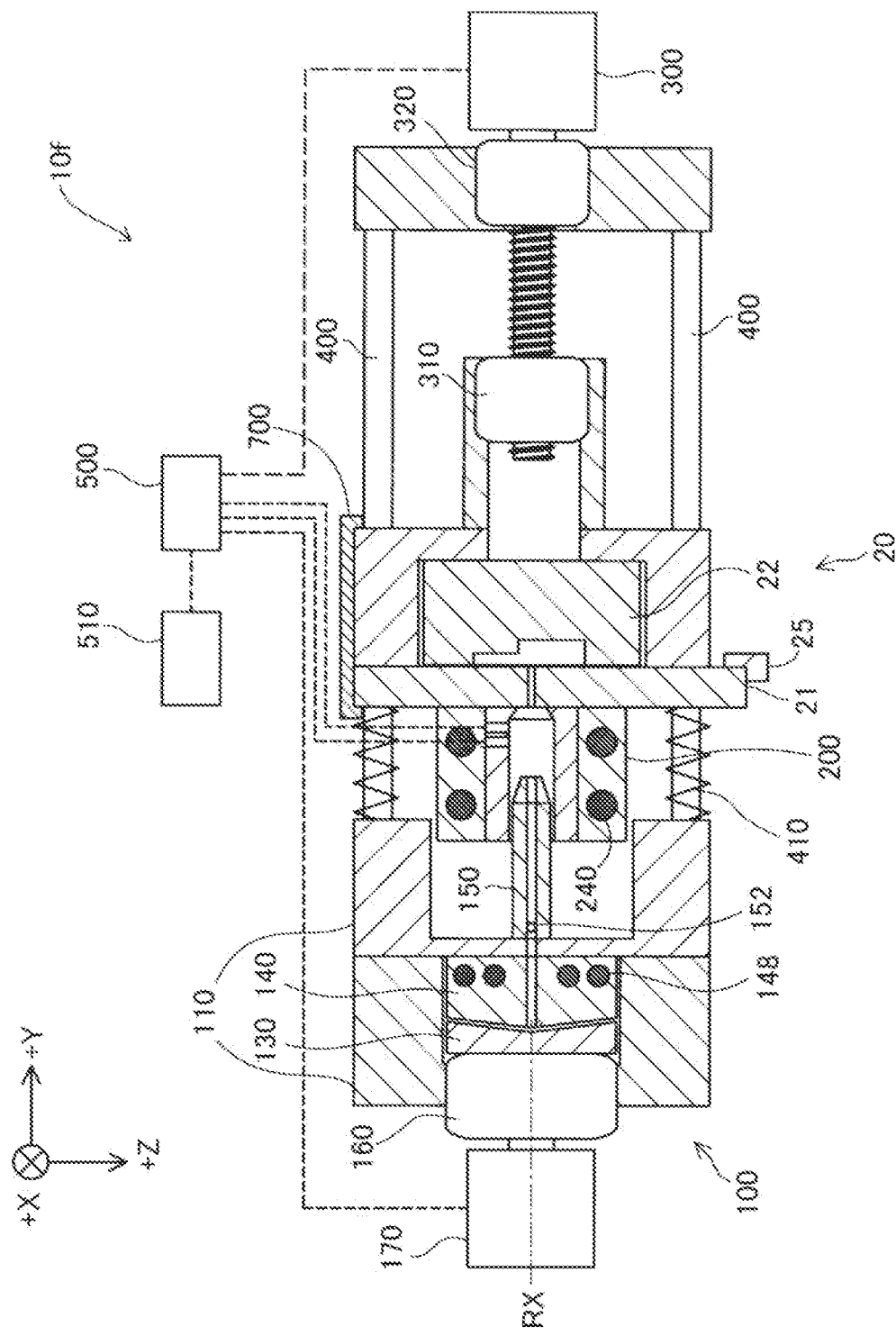
FIG. 17 is a diagram illustrating a schematic configuration of an injection molding apparatus according to a sixth embodiment.

FIG. 17 is a diagram illustrating a schematic configuration of an injection molding apparatus 10f according to a sixth embodiment. The injection molding apparatus 10f of the sixth embodiment includes a clamp 700 that assists in mold clamping of the first mold 21 and the second mold 22. After the mold clamping is performed, the clamp 700 is transported by a movement mechanism (not illustrated) to sandwich the first mold 21 and the second mold 22. With such a configuration, even when the first force applying portion 410 is configured with an elastic body such as a coil spring, a large mold clamping force can be ensured.

G. Other Embodiments (G-1) In the above embodiment, the control portion 500 may control the rotation speed or torque of the screw drive motor 170 depending on the pressure Pr that is detected by the pressure detection portion 220. By doing so, the control portion 500 can control the amount of the plasticized material produced in the plasticizing portion 100 depending on the pressure Pr. For example, the control portion 500 decreases the rotation speed of the screw drive motor 170 as the pressure Pr increases, and increases the rotation speed of the screw drive motor 170 as the pressure Pr decreases. By doing so, it becomes possible to perform measurement with high accuracy, so that the molding quality can be improved.

(G-2) In the above embodiment, the control portion 500 controls the heating portion 240 that is provided in the measurement injection portion 200 depending on the temperature which is detected by the temperature detection portion 230. In contrast to this, the control portion 500 may control the heating portion 240 depending on the pressure Pr detected by the pressure detection portion 220 during the injection operation or the measurement operation. Specifically, the control portion 500 performs a process of reducing an output of the heating portion 240 as the pressure Pr increases. By doing so, the viscosity of the plasticized material inside the measurement injection portion 200 can be stabilized.

(G-3) In the above embodiment, during injection operation or after the measurement operation, notification is performed using the notification portion 510 by comparing the pressure Pr inside the measurement injection portion 200 with the first threshold value TH1 or the second threshold value TH2. In contrast to this, it is not necessary to perform the notification using the notification portion 510.

(G-4) In the above embodiment, the measurement injection portion 200 includes the heating portion 240. In contrast to this, the measurement injection portion 200 does not have to include the heating portion 240. For example, a heat insulating material may be disposed around the measurement injection portion 200.

(G-5) In the above embodiment, as the screw 130, the plasticizing portion 100 adopts a screw having a substantially cylindrical shape whose height in the direction along the central axis RX is smaller than the diameter. In contrast to this, the plasticizing portion 100 may adopt an in-line screw formed in a spiral shape.

H. Other Aspects

The present disclosure is not limited to the above-described embodiments and can be realized with various configurations without departing from the spirit of the present disclosure. For example, the technical features in the embodiments corresponding to the technical features in each form described below can be appropriately replaced or combined in order to solve some or all of the above problems or to achieve some or all of the above effects. Further, when the technical features are not described as essential in this specification, they can be deleted as appropriate.

(1) According to a first aspect of the present disclosure, an injection molding apparatus is provided. The injection molding apparatus includes: a plasticizing portion producing a plasticized material by plasticizing a material; a measurement injection portion that is disposed between the plasticizing portion and a molding mold, measures the plasticized material, and injects the measured plasticized material into the molding mold; a first drive portion changing a relative position between the plasticizing portion and the measurement injection portion; a pressure detection portion detecting a pressure inside the measurement injection portion; and a control portion, in which the measurement injection portion is configured such that a volume of an internal space thereof, in which the plasticized material is stored, changes according to a change in the relative position between the measurement injection portion and the plasticizing portion, and the control portion executes at least one of a measurement operation of causing the measurement injection portion to measure the plasticized material by controlling the first drive portion to move the plasticizing portion and the measurement injection portion in a direction away from each other, and an injection operation of injecting the measured plasticized material into the molding mold by controlling the first drive portion to move the plasticizing portion and the measurement injection portion in a direction approaching each other depending on the pressure.

According to such an aspect, the pressure inside the measurement injection portion is detected, and at least one of the measurement operation and the injection operation is executed depending on the pressure so that the molding quality can be improved.

(2) In the above aspect, the control portion may control a relative movement speed between the plasticizing portion and the measurement injection portion depending on the pressure. With such an aspect, by controlling the relative movement speed between the plasticizing portion and the measurement injection portion depending on the pressure, the molding quality can be improved.

(3) In the above aspect, the control portion may control an amount of the plasticized material produced in the plasticizing portion depending on the pressure. With such an aspect, by controlling the amount of the plasticized material produced in the plasticizing portion depending on the pressure, the molding quality can be improved.

(4) In the above aspect, a notification portion may be further included, in which in the injection operation, when the pressure exceeds a first threshold value, the control portion may stop the injection operation and perform notification by controlling the notification portion. With such an aspect, since it is possible to suppress the occurrence of molding defects, the molding quality can be improved.

(5) In the above aspect, a notification portion may be further included, in which after the measurement operation, when the pressure is less than a second threshold value, the control portion may perform notification by controlling the notification portion. With such an aspect, since it is possible to suppress the occurrence of molding defects, the molding quality can be improved.

(6) In the above aspect, the measurement injection portion may have a heating portion. With such an aspect, since it is possible to suppress a decrease in the temperature of the plasticized material during measurement, the molding quality can be improved.

(7) In the above aspect, a temperature detection portion detecting a temperature of the measurement injection portion may be further included, in which the control portion may control the heating portion depending on the temperature of the measurement injection portion or the pressure. With such an aspect, since the temperature of the plasticized material during the measurement can be maintained constant, the molding quality can be improved.

(8) In the above aspect, a first force applying portion applying a force in a direction of pulling the measurement injection portion and the plasticizing portion away from each other, may be further included. With such a configuration, the mold clamping force can be adjusted by the first force applying portion.

(9) In the above aspect, a second force applying portion applying a force in a direction of pulling a first mold and a second mold that constitute the molding mold away from each other, may be further included. In such an aspect, the mold clamping can be gradually performed, and the mold opening can be assisted by the second force applying portion.

(10) In the above aspect, the first drive portion may have a function of opening/closing the molding mold in addition to a function of changing the relative position between the plasticizing portion and the measurement injection portion. With such an aspect, the injection molding apparatus can be miniaturized.

(11) In the above aspect, a second drive portion for opening/closing the molding mold may be further included. In such an aspect, the mold clamping force can be increased by the second drive portion.

(12) In the above aspect, the plasticizing portion may include a screw that rotates around a rotation axis and has a groove forming surface on which a groove is formed, and a barrel that has a facing surface facing the groove forming surface and is provided with a communication hole on the facing surface through which the plasticized material flows out. With such an aspect, the injection molding apparatus can be miniaturized.

(13) According to a second aspect of the present disclosure, there is provided a method executed by an injection molding apparatus including a plasticizing portion producing a plasticized material by plasticizing a material, a measurement injection portion that is disposed between the plasticizing portion and a molding mold, measures the plasticized material, and injects the measured plasticized material into the molding mold, a first drive portion changing a relative position between the plasticizing portion and the measurement injection portion, and a pressure detection portion for detecting a pressure inside the measurement injection portion, in which the measurement injection portion is configured such that a volume of a space thereof, in which the plasticized material is stored, changes according to a change in the relative position between the measurement injection portion and the plasticizing portion. The method includes a measurement step of causing the measurement injection portion to measure the plasticized material by controlling the first drive portion to move the plasticizing portion and the measurement injection portion in a direction away from each other; and an injection step of injecting the measured plasticized material into the molding mold by controlling the first drive portion to move the plasticizing portion and the measurement injection portion in a direction approaching each other, in which at least one of the measurement step and the injection step is executed depending on the pressure.

What is claimed is:

1. An injection molding apparatus comprising:
 a plasticizing portion producing a plasticized material by plasticizing a material;
 a measurement injection portion that is disposed between the plasticizing portion and a molding mold, measures the plasticized material, and injects the measured plasticized material into the molding mold;
 a first drive portion changing a relative position between the plasticizing portion and the measurement injection portion;
 a pressure detection portion detecting a pressure inside the measurement injection portion; and
 a control portion, wherein
 the measurement injection portion is configured such that a volume of an internal space thereof, in which the plasticized material is stored, changes according to a change in the relative position between the measurement injection portion and the plasticizing portion, and
 the control portion executes at least one of
  a measurement operation of causing the measurement injection portion to measure the plasticized material by controlling the first drive portion to move the plasticizing portion and the measurement injection portion in a direction away from each other, and
  an injection operation of injecting the measured plasticized material into the molding mold by controlling the first drive portion to move the plasticizing portion and the measurement injection portion in a direction approaching each other,
 depending on the pressure;
 wherein the control portion controls a relative movement speed between the plasticizing portion and the measurement injection portion depending on the pressure.

2. The injection molding apparatus according to claim 1, wherein
 the control portion controls an amount of the plasticized material produced in the plasticizing portion depending on the pressure.

3. The injection molding apparatus according to claim 1, further comprising:
 a notification portion, wherein
 in the injection operation, when the pressure exceeds a first threshold value, the control portion stops the injection operation and performs notification by controlling the notification portion.

4. The injection molding apparatus according to claim 1, further comprising:
 a notification portion, wherein
 after the measurement operation, when the pressure is less than a second threshold value, the control portion performs notification by controlling the notification portion.

5. The injection molding apparatus according to claim 1, wherein
 the measurement injection portion has a heating portion.

6. The injection molding apparatus according to claim 5, further comprising:
 a temperature detection portion detecting a temperature of the measurement injection portion, wherein
 the control portion controls the heating portion depending on the temperature of the measurement injection portion or the pressure.

7. The injection molding apparatus according to claim 1, further comprising:
 a first force applying portion applying a force in a direction of pulling the measurement injection portion and the plasticizing portion away from each other.

8. The injection molding apparatus according to claim 1, further comprising:
 a second force applying portion applying a force in a direction of pulling a first mold and a second mold that constitute the molding mold away from each other.

9. The injection molding apparatus according to claim 1, wherein
 the first drive portion has a function of opening/closing the molding mold in addition to a function of changing the relative position between the plasticizing portion and the measurement injection portion.

10. The injection molding apparatus according to claim 1, further comprising:

a second drive portion for opening/closing the molding mold.

11. The injection molding apparatus according to claim 1, wherein
the plasticizing portion includes
- a screw that rotates around a rotation axis and has a groove forming surface on which a groove is formed, and
- a barrel that has a facing surface facing the groove forming surface and is provided with a communication hole on the facing surface through which the plasticized material flows out.

12. A method executed by an injection molding apparatus that includes
- a plasticizing portion producing a plasticized material by plasticizing a material,
- a measurement injection portion that is disposed between the plasticizing portion and a molding mold, measures the plasticized material, and injects the measured plasticized material into the molding mold,
- a first drive portion changing a relative position between the plasticizing portion and the measurement injection portion, and
- a pressure detection portion for detecting a pressure inside the measurement injection portion, in which
the measurement injection portion is configured such that a volume of a space thereof, in which the plasticized material is stored, changes according to a change in the relative position between the measurement injection portion and the plasticizing portion, the method comprising:
- a measurement step of causing the measurement injection portion to measure the plasticized material by controlling the first drive portion to move the plasticizing portion and the measurement injection portion in a direction away from each other; and
- an injection step of injecting the measured plasticized material into the molding mold by controlling the first drive portion to move the plasticizing portion and the measurement injection portion in a direction approaching each other, wherein
at least one of the measurement step and the injection step is executed depending on the pressure;
wherein a control portion controls a relative movement speed between the plasticizing portion and the measurement injection portion depending on the pressure.

* * * * *